United States Patent
Lim et al.

(10) Patent No.: US 9,050,693 B2
(45) Date of Patent: Jun. 9, 2015

(54) MANUFACTURING DEVICE HAVING CLAMP UNIT

(71) Applicant: Hyundai Motor Company, Seoul (KR)

(72) Inventors: Dong Sich Lim, Ulsan (KR); Seung Chan Lee, Ulsan (KR); Hong Sik Min, Ulsan (KR); Hyun Jung Chang, Ulsan (KR)

(73) Assignee: Hyundai Motor Company, Seoul (KR)

( * ) Notice: Subject to any disclaimer, the term of this patent is extended or adjusted under 35 U.S.C. 154(b) by 222 days.

(21) Appl. No.: 13/724,478

(22) Filed: Dec. 21, 2012

(65) Prior Publication Data

US 2014/0117604 A1 May 1, 2014

(30) Foreign Application Priority Data

Oct. 26, 2012 (KR) .......................... 10-2012-0119954

(51) Int. Cl.
*B23Q 3/08* (2006.01)
*B23Q 3/00* (2006.01)
*B23Q 3/14* (2006.01)
*B23Q 1/00* (2006.01)
*B23Q 3/06* (2006.01)

(52) U.S. Cl.
CPC ........ *B23Q 1/009* (2013.01); *B23Q 3/06* (2013.01); *B23Q 2230/002* (2013.01)

(58) Field of Classification Search
USPC .................................... 269/309, 310, 24, 27
See application file for complete search history.

(56) References Cited

U.S. PATENT DOCUMENTS 6,095,509 A * 8/2000 Yonezawa ..................... 269/309

* cited by examiner

Primary Examiner — Lee D Wilson
Assistant Examiner — Nirvana Deonauth
(74) Attorney, Agent, or Firm — Mintz Levin Cohn Ferris Glovsky and Popeo, P.C.; Peter F. Corless

(57) ABSTRACT

A manufacturing device having a clamp unit according to an exemplary embodiment of the present invention may include a workpiece disposed on a frame, a clamp unit configured to fix the workpiece on the frame, and a spindle configured to a torque transferred from a motor to cut the workpiece or operates the clamp unit to make the clamp unit fix the workpiece on the frame.

7 Claims, 2 Drawing Sheets

MANUFACTURING DEVICE HAVING CLAMP UNIT

CROSS-REFERENCE TO RELATED APPLICATION

This application claims priority to and the benefit of Korean Patent Application No. 10-2012-0119954 filed in the Korean Intellectual Property Office on Oct. 26, 2012, the entire contents of which are incorporated herein by reference.

BACKGROUND OF THE INVENTION (a) Field of the Invention

The present invention relates to a manufacturing device having a clamp unit, and more particularly, to a manufacturing device having a clamp unit that fixes a workpiece to enable the workpiece to be manufactured.

(b) Description of the Related Art

A clamp device that may be called a hole clamp is used when an upper portion or a side portion of a workpiece is cut. The hole clamp can be applied to cut the workpiece of which upper portion or side portion thereof cannot be clamped.

In a hole clamp, a seating surface on which a workpiece is mounted, is formed on the clamping device, a gripper is inserted into a bore that is formed at a lower side of the workpiece so the gripper is contact with the interior circumference of the bore to fix the workpiece on the clamping device. Moreover, hydraulic pressure is used to enable the gripper to be pushed toward the interior circumference of the bore. The hydraulic pressure device includes a hydraulic pressure tank, a hydraulic pressure pump, and oil lines. However, working environments may be polluted by leaking oil from the hydraulic pressure device.

The above information disclosed in this section is only for enhancement of understanding of the background of the invention and therefore it may contain information that does not form the prior art that is already known in this country to a person of ordinary skill in the art.

SUMMARY

The present invention has been made in an effort to provide a manufacturing device having a clamp unit having the advantage of not requiring a hydraulic pressure device which may leak oil into the working environments (i.e., the device does not require hydraulic pressure to operate).

A manufacturing device having a clamp unit according to an exemplary embodiment of the present invention may include a workpiece disposed on a frame, a clamp unit that fixes the workpiece on the frame, and a spindle that uses a torque transferred from a motor to cut the workpiece or operates the clamp unit to make the clamp unit fix the workpiece on the frame.

The clamp unit may include: a drive shaft disposed on the frame to receive the torque from the spindle; a clamping rod mounted on the frame, and may be drawn backward or pushed forward according to the rotation direction of the drive shaft; a taper rod disposed at a front end portion of the clamping rod, and may be inserted into a clamping bore formed at one side of the workpiece, and in which a slanted surface is formed on an exterior surface thereof; and a gripper fixed on the frame and disposed between the slanted surface of the taper rod and the interior circumference of the clamping bore, wherein the gripper may be pushed outward by movement of the taper rod to contact the interior circumference of the clamping bore such that the workpiece may be fixed by the gripper.

The spindle may be operated by a motor torque, and a torque wrench may be mounted on an end portion thereof. The drive shaft may be rotatably disposed on the frame, a torque connection portion may be formed at one end portion of the drive shaft to receive the torque from the torque wrench, a drive bevel gear may be formed at the other end portion of the drive shaft, and a driven bevel gear may be rotatably disposed on the frame to receive the torque from the drive bevel gear, wherein the driven bevel gear may be engaged with the clamping rod through a threaded structure and pushes or draws the clamping rod in a horizontal direction according to the rotating direction thereof.

A rear end portion of the clamping rod may be inserted into a central portion of the driven bevel gear, and threads may be respectively formed on the exterior circumference of the clamping rod and the interior circumference of the driven bevel gear. The clamping rod may include a first shaft that may be engaged with the driven bevel gear, and a second shaft that may be coaxially disposed with the first shaft and of which the taper rod is disposed at a front end portion thereof.

The clamping bore of the workpiece may be disposed in a lower direction on the frame and the taper rod that is inserted into the clamping bore may be disposed at an upper end portion of the clamping rod. The workpiece may be an engine block. A support portion may be formed on the frame along the surroundings of the clamping rod, and the workpiece may be seated on the support portion.

As describe above, a manufacturing device having a clamp unit according to an exemplary embodiment of the present invention may use motor torque to operate a clamping device instead of a hydraulic pressure device, to prevent potential oil leaks in the working environments.

DETAILED DESCRIPTION OF THE EMBODIMENTS

An exemplary embodiment of the present invention will hereinafter be described in detail with reference to the accompanying drawings.

Figure 1:
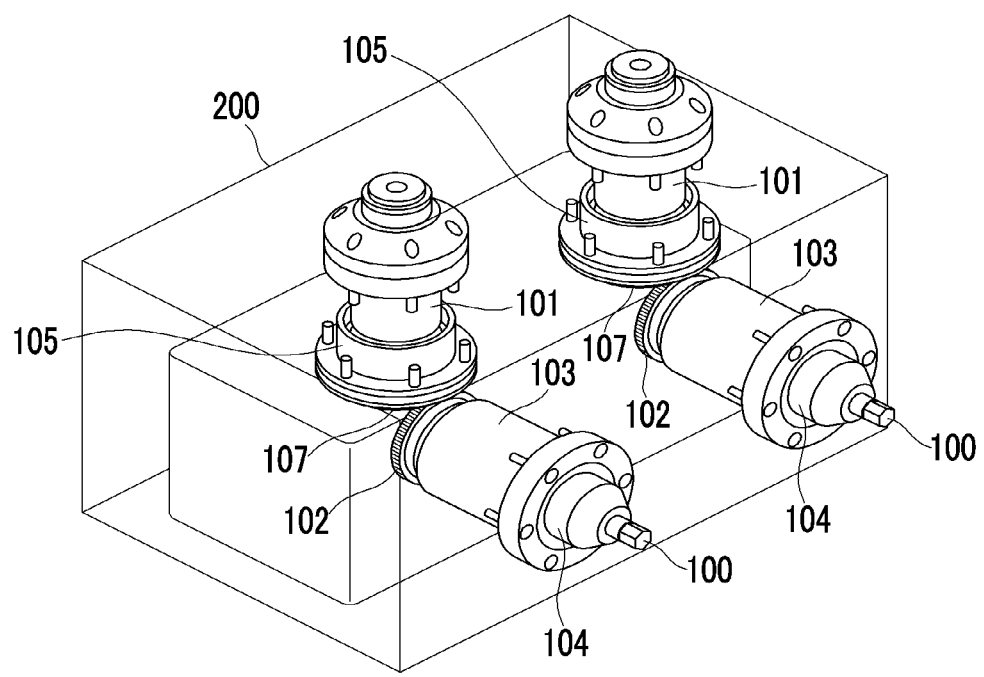
FIG. 1 is an exemplary partial view of a manufacturing device having a clamp unit, according to an exemplary embodiment of the present invention.

FIG. 1 is an exemplary partial view of a manufacturing device having a clamp unit, according to an exemplary embodiment of the present invention.

Referring to FIG. 1, a manufacturing device may include a torque connection portion 100, a drive shaft 104, a drive shaft housing 103, a drive bevel gear 102, a driven bevel gear 107, a rod housing 105, and a clamping rod 106. The drive bevel gear 102 may be rotated by a motor while the driven bevel gear 107 may be rotated by the rotation of the drive bevel gear 102 through a plurality of interconnecting or meshing threads of each bevel gear. The drive shaft housing 103 may be fixed on a frame 200 in a horizontal direction, and the drive shaft 104 may be rotatably inserted into the drive shaft housing 103. The torque connection portion 100 may be formed at an exterior end portion of the drive shaft 104 to receive torque, and the drive bevel gear 102 may be formed at an inner side end portion thereof. The rod housing 105 may be fixed on the frame 200 in a vertical direction, and the clamping rod 106 may be disposed in the rod housing 105. The driven bevel gear 107 may be rotatably disposed between the rod housing 105 and the clamping rod 106.

When torque is transferred to the drive shaft 104 through the torque connection portion 100, the torque may be transferred to the driven bevel gear 107 through the drive bevel gear 102. When the driven bevel gear 107 is rotated by the drive bevel gear 102 rotation, the clamping rod 106 may move in an upward or downward direction.

Figure 2:
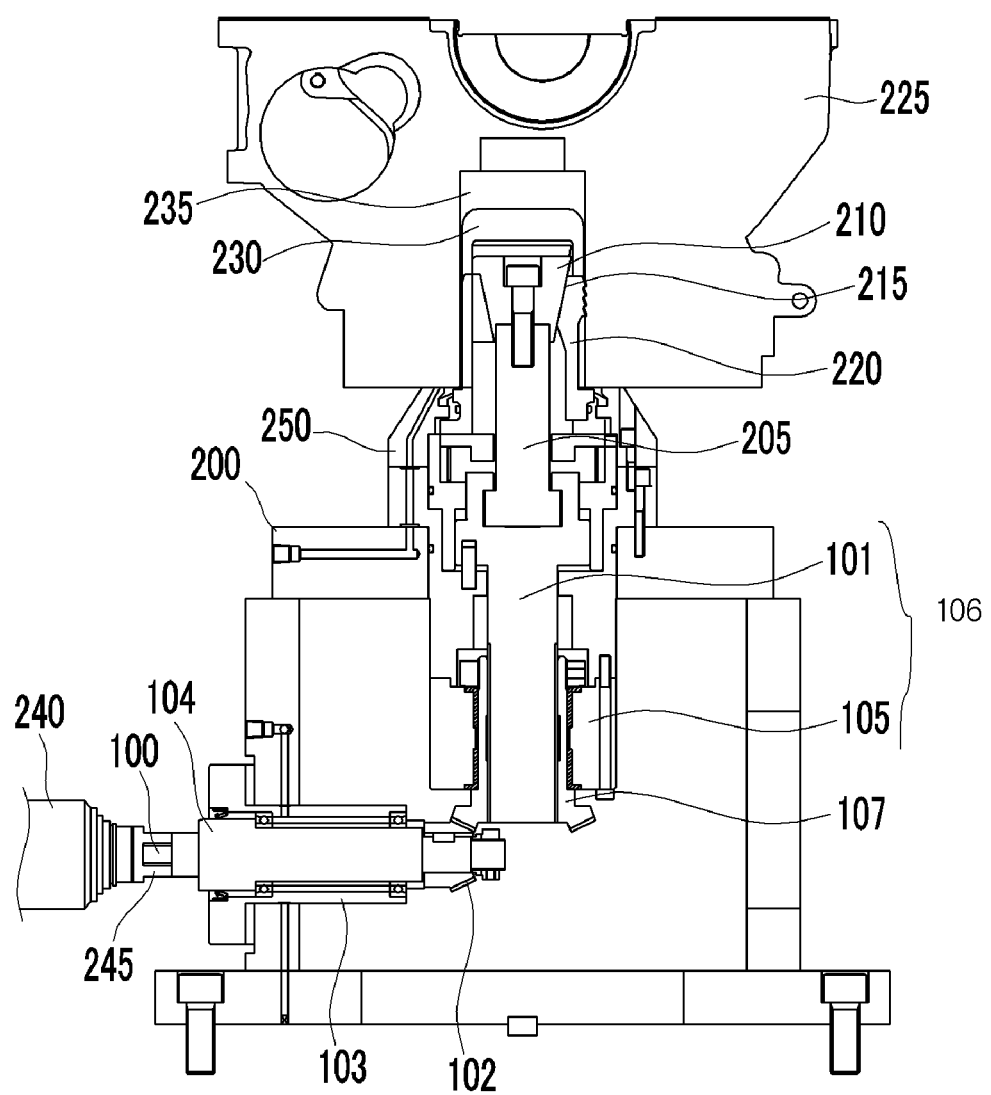
FIG. 2 is an exemplary cross-sectional view of a manufacturing device having a clamp unit, according to an exemplary embodiment of the present invention.

FIG. 2 is an exemplary cross-sectional view of a manufacturing device having a clamp unit, according to an exemplary embodiment of the present invention.

In an exemplary embodiment of the present invention, a workpiece 225 may be seated on an upper portion of the clamping rod 106, and a clamp unit may be prepared to fix the workpiece 225. Referring to FIG. 2, the clamp unit will be further described in detail.

Referring to FIG. 2, a manufacturing device having a clamp unit may include a frame 200, a drive shaft housing 103, a drive shaft 104, a torque connection portion 100, a drive bevel gear 102, a torque wrench 245, a spindle 240, a driven bevel gear 107, a rod housing 105, a clamping rod 106, a taper rod 210, a gripper 220, a cap 230, and a workpiece 225.

Moreover, the drive shaft housing 103 may be fixed at a lower portion of the frame 200 and the drive shaft 104 may be rotatably inserted into the drive shaft housing 103. The torque connection portion 100 may be formed at an exterior end portion of the drive shaft 104, and the torque connection portion 100 may receive torque from the torque wrench 245 mounted at a front end portion of the spindle 240. The drive bevel gear 102 may be formed at an inner side end portion of the drive shaft 104, and the drive bevel gear 102 may transfer torque to the driven bevel gear 107. The driven bevel gear 107 may be rotatably disposed in the rod housing 105. The rod housing 105 may be fixed on the frame 200, and the driven bevel gear 107 may be disposed on an interior circumference of the rod housing 105.

The clamping rod 106 may be inserted into a central portion of the driven bevel gear 107, and the interior circumference of the driven bevel gear 107 may be engaged with the exterior circumference of the clamping rod 106 through a threaded structure. Accordingly, when the driven bevel gear 107 rotates in the rod housing 105, the clamping rod (101 and 205) may move in an upward or downward direction.

The clamping rod 106 may include a first shaft 101 disposed at a lower side and a second shaft 205 coaxially disposed with the first shaft 101 to be connected with the first shaft 101. A lower end portion of the first shaft 101 may be inserted into a central portion of the driven bevel gear 107. In this exemplary embodiment of the present invention, it is described that the clamping rod 106 may be divided into the first and second shafts, but the clamping rod may be one shaft.

The taper rod 210 may be disposed at an upper end portion of the second shaft 205. A slanted surface 215 may be formed at a side surface of the taper rod 210, wherein the slanted surface 215 may be slanted in an axial direction.

A clamping bore 235 having an opening in a lower side may be formed at a lower side of the workpiece 225, into which an upper end portion of the second shaft 205 and the taper rod 210 may be inserted. Further, the gripper 220 may be disposed between the slanted surface 215 of the taper rod 210 and the interior circumference of the clamping bore 235. The gripper 220 may be fixed on the frame 200 through a support portion 250 disposed at a lower side of the gripper 220. Further, a front end portion of the taper rod 210 may be covered by a cap 230 that is separately prepared. The cap 230 may protect the taper rod 210 and the gripper 220 and allows smooth insertion of the taper rod 210 into the clamping bore 235.

In an exemplary embodiment of the present invention, a predetermined program may control the spindle 240 such that the torque wrench is mounted on the spindle 240, and the spindle 240 rotates the torque connection portion 100 through the motor torque and the torque wrench 245. In addition, when the drive bevel gear 102 disposed at an end portion of the drive shaft 104 is rotated by the torque connection portion 100, the driven bevel gear 107 disposed in the rod housing 105 may be rotated.

When the driven bevel gear 107 rotates, the first and second shafts 101 and 205 may be drawn in a lower direction. Furthermore, when the first and second shaft 101 and 205 are drawn in the lower direction, the slanted surface of the taper rod 210 may expand the gripper 220 toward an exterior. Accordingly, the gripper 220 forcibly contacts the interior circumference of the clamping bore 235 by the slanted surface of the taper rod 210, and the workpiece 225 may be fixed on the frame 200 without the use of hydraulic pressure to clamp the workpiece.

In an exemplary embodiment of the present invention, the support portion 250 may be disposed on the frame 200 along an exterior of the clamping rod 106, and the upper surface of the support portion 250 contacts the lower surface of the workpiece 225. Accordingly, when the gripper 220 forcibly contacts the interior circumference of the clamping bore 235, the workpiece 225 may be further stably fixed on the support portion 250 and the frame.

In an exemplary embodiment of the present invention, a tool other than the torque wrench 245 may be mounted on a front end portion of the spindle 240, and the spindle may use the tool to cut the workpiece. The spindle 240 may use the torque transferred from the motor to cut the workpiece 225 through the tool mounted on the front end portion thereof. The method and the structure in which the spindle 240 uses the tool to cut the workpiece 225 has been known to a person skilled in this art, and the detailed description thereof will be omitted in an exemplary embodiment of the present invention.

In addition, when the workpiece 225 is seated on the frame, the spindle 240 may select the torque wrench 245 through a predetermined program and transfer a predetermined torque to the drive shaft 104 at a predetermined rotation speed to fix the workpiece 225 on the frame 200. When the workpiece 225 is fixed on the frame 200, an automatic control apparatus may select a predetermined tool through a predetermined program to sequentially manufacture the workpiece 225.

While this invention has been described in connection with what is presently considered to be exemplary embodiments, it is to be understood that the invention is not limited to the disclosed embodiments. On the contrary, it is intended to cover various modifications and equivalent arrangements included within the spirit and scope of the appended claims.

What is claimed is:

1. A manufacturing device having a clamp unit, comprising:
   a workpiece disposed on a frame;
   a clamp unit configured to fix the workpiece on the frame;
   a spindle configured to use a torque transferred from a motor to operate the clamp unit to fix the workpiece on the frame, wherein the spindle is operated by a motor torque, wherein a torque wrench is mounted on an end portion of the motor torque;
   a drive shaft disposed on the frame is configured to receive the torque from the spindle;

a clamping rod mounted on the frame is configured to be drawn backward or pushed forward according to a rotation direction of the drive shaft;

a taper rod disposed at a front end portion of the clamping rod, is inserted into a clamping bore formed at one side of the workpiece, and in which a slanted surface is formed at an exterior surface of the workpiece;

a gripper fixed on the frame and disposed between the slanted surface of the taper rod and the interior circumference of the clamping bore, wherein the gripper is pushed out by movement of the taper rod to contact the interior circumference of the clamping bore to fix the workpiece;

a torque connection portion is formed at one end portion of the drive shaft rotatably disposed on the frame, wherein the torque connection portion is configured to receive the torque from the torque wrench;

a drive bevel gear is formed at the other end portion of the drive shaft; and a driven bevel gear is rotatably disposed on the frame and is configured to receive the torque from the drive bevel gear, wherein the driven bevel gear is engaged with the clamping rod through a threaded structure and is configured to push or draw the clamping rod in a horizontal direction corresponding to the rotating direction of the driven bevel gear.

2. The manufacturing device of claim 1, wherein the spindle uses the torque transferred from the motor to cut the workpiece.

3. The manufacturing device of claim 1, wherein a rear end portion of the clamping rod is inserted into a central portion of the driven bevel gear, and a plurality of threads are formed on the exterior circumference of the clamping rod and the interior circumference of the driven bevel gear.

4. The manufacturing device of claim 1, wherein the clamping rod includes:

a first shaft configured to engage with the driven bevel gear; and a second shaft coaxially disposed with the first shaft, wherein the taper rod is disposed at a front end portion of the second shaft.

5. The manufacturing device of claim 1, wherein the clamping bore of the workpiece is disposed in a lower direction on the frame and the taper rod that is inserted into the clamping bore is disposed at an upper end portion of the clamping rod.

6. The manufacturing device of claim 1, wherein the workpiece is an engine block.

7. The manufacturing device of claim 1, wherein a support portion is formed on the frame along an exterior of the clamping rod, and the workpiece is seated on the support portion.

* * * * *